(12) United States Patent
Kim et al.

(10) Patent No.: US 9,338,620 B2
(45) Date of Patent: May 10, 2016

(54) METHOD AND APPARATUS FOR EXECUTING ALARM WITH RESPECT TO MISSED RECEIVED CALL FOR MOBILE COMMUNICATION TERMINAL

(71) Applicant: Samsung Electronics Co., Ltd., Suwon-si, Gyeonggi-do (KR)

(72) Inventors: Nam-Hoon Kim, Suwon-si (KR); Jeong-Gwan Kang, Hwaseong-si (KR); Hyun-Su Hong, Seongnam-si (KR); Jin Ra, Suwon-si (KR); Jong-Hyun Ryu, Daejeon (KR); Yong-Gook Park, Yongin-si (KR); Han-Joo Chae, Seoul (KR); Won-Young Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/182,657

(22) Filed: Feb. 18, 2014

(65) Prior Publication Data

US 2014/0273976 A1 Sep. 18, 2014

(30) Foreign Application Priority Data

Mar. 12, 2013 (KR) ........................ 10-2013-0026294

(51) Int. Cl.
*H04W 4/16* (2009.01)
*H04W 4/02* (2009.01)

(52) U.S. Cl.
CPC ................ *H04W 4/16* (2013.01); *H04W 4/027* (2013.01)

(58) Field of Classification Search
CPC .............. H04M 1/57; H04M 1/72563; H04M 1/72569; H04M 15/83; H04M 2250/12; H04M 2250/60; H04M 3/42034; H04M 3/436; H04W 4/025; H04W 4/027; H04W 68/00; H04W 4/16
USPC ............. 455/412.1–412.2, 414.1, 456.1–457; 379/88.12, 100.06
See application file for complete search history.

(56) References Cited

U.S. PATENT DOCUMENTS

| | | | |
|---|---|---|---|
| 6,728,349 B2 | 4/2004 | Chang et al. | |
| 8,379,816 B1 * | 2/2013 | Lu et al. | 379/142.01 |
| 2005/0250551 A1 * | 11/2005 | Helle | 455/567 |
| 2008/0220824 A1 | 9/2008 | Miyoshi et al. | |
| 2010/0216509 A1 * | 8/2010 | Riemer et al. | 455/557 |
| 2010/0323657 A1 * | 12/2010 | Barnard et al. | 455/404.1 |
| 2012/0176236 A1 * | 7/2012 | Kao et al. | 340/502 |

FOREIGN PATENT DOCUMENTS

| | | |
|---|---|---|
| JP | 2008-227639 A | 9/2008 |
| JP | 4 232 619 B2 | 3/2009 |
| JP | 2009-290304 A | 12/2009 |
| KR | 10-2004-0037360 A | 5/2004 |

* cited by examiner

*Primary Examiner* — Michael Mapa
(74) *Attorney, Agent, or Firm* — Jefferson IP Law, LLP

(57) ABSTRACT

A method of executing an alarm with respect to a missed received call for a mobile communication terminal is provided. The method includes determining whether the mobile communication terminal is moving, and determining whether a missed received call occurs while the mobile communication terminal is moving, and executing an alarm with respect to the missed received call when it is determined that the mobile communication terminal does not move for a period of time if it is determined that the missed received call occurs while the mobile communication terminal is moving.

16 Claims, 3 Drawing Sheets

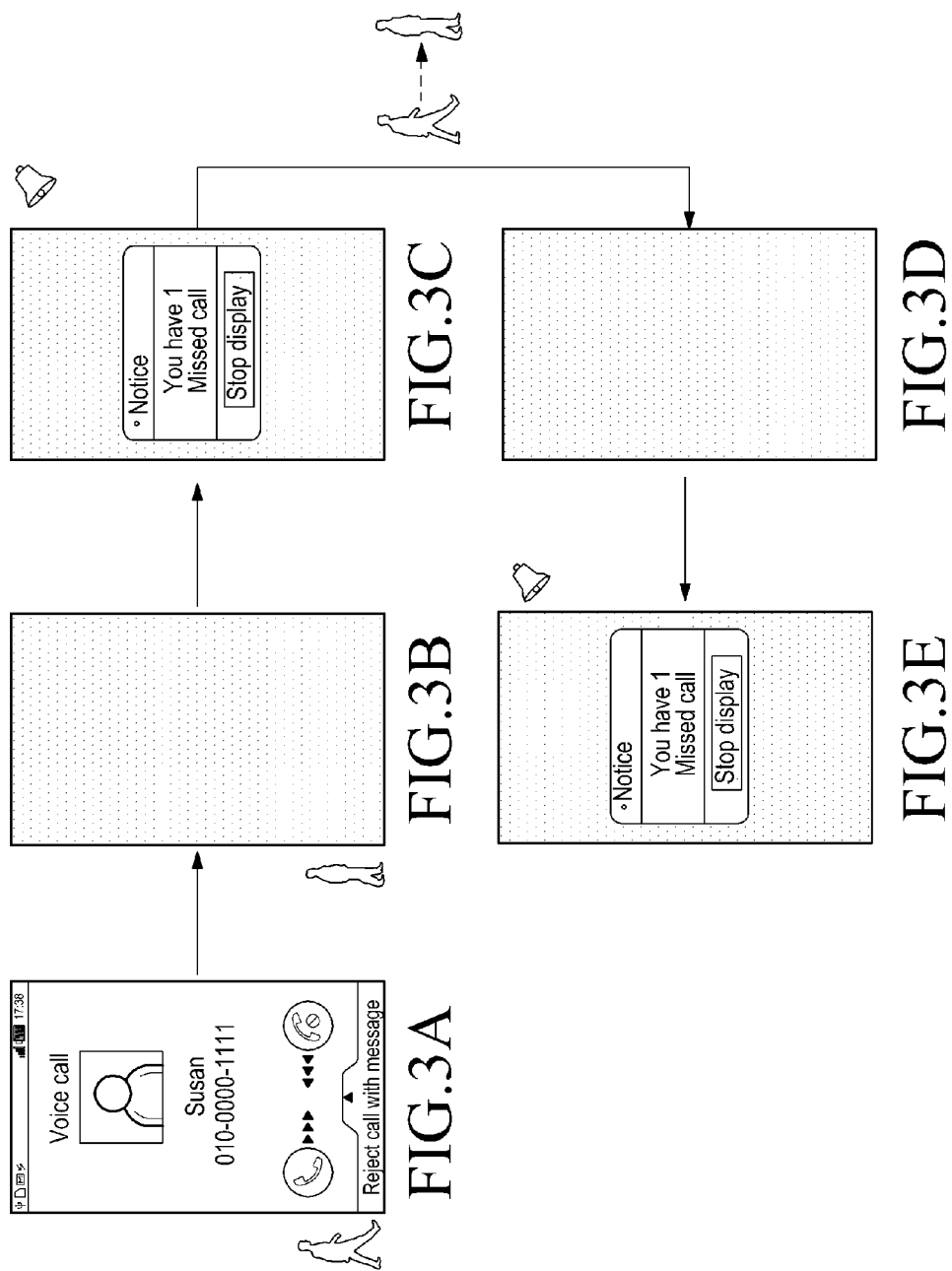

METHOD AND APPARATUS FOR EXECUTING ALARM WITH RESPECT TO MISSED RECEIVED CALL FOR MOBILE COMMUNICATION TERMINAL

CROSS-REFERENCE TO RELATED APPLICATION(S)

This application claims the benefit under 35 U.S.C. §119 (a) of a Korean patent application filed on Mar. 12, 2013 in the Korean Intellectual Property Office and assigned Serial number 10-2013-0026294, the entire disclosure of which is hereby incorporated by reference.

TECHNICAL FIELD

The present disclosure relates to a technology associated with an alarm of a mobile communication terminal. More particularly, the present disclosure relates to a method and apparatus for executing an alarm with respect to a missed received call for a mobile communication terminal that has a phone call function.

BACKGROUND

Mobile communication terminals, such as a portable phone, a smart phone, a tablet Personal Computer (PC), a Personal Digital Assistants (PDA), and the like, include technologies that help remind a user of an important event or a certain thing that should be done by the user, and such technologies have been variously developed and applied. For example, generally, an alarm is used for notifying of a predetermined time or an anniversary, or an alarm is used for a wake-up call.

The mobile communication terminal having a phone call function may also include a technology that informs a user of a missed received call that the user fails to recognize, for example, a missed call. In particular, when a user picks up a mobile communication terminal after a call is missed in a state in which a movement of the mobile communication terminal stops, for example, a state of being placed on a table and the like, a technology that informs the user of the missed call or provides an alarm at predetermined time intervals has been developed and embodied.

As related-art that is associated with an alarm, with respect to a missed received call for a mobile communication terminal, there is Japanese published patent No. 2009-290304, titled "*Portable terminal apparatus and program*", having an inventor MAEHARA TOSHIAKI, an applicant CASIO HITACHI MOBILE, and a publication date of Dec. 10, 2009. When the mobile communication terminal is in a case where the user of the mobile communication terminal has difficulty in recognizing a report for a received call, the mobile communication terminal restrains providing of the report and executes reporting of the received call based on a change in the situation, such as when the mobile communication terminal is in a situation where the user of the mobile communication terminal may more easily recognize the report.

According to the disclosure of the Japanese published patent No. 2009-290304, when a user moves, that is, when a mobile communication terminal does not stop, a received call may not be provided. Also, according to related-arts associated with an alarm, with respect to a missed received call for a mobile communication terminal, in a case of a missed call occurring while a user moves, although an alarm is provided at predetermined intervals, the user may fail to recognize the alarm due to the movement of the user when the user continuously moves. Also, an alarm frequently provided irrespective of a user's circumstance may cause inconvenience for a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for executing an alarm with respect to a missed received call for a mobile communication terminal so as to quickly inform a user of the missed received call by recognizing a state of a movement of the user of the mobile communication terminal when the user does not recognize the received call, wherein the received call may be a phone call, a text message, a multimedia message, and the like.

In particular, the method and apparatus may recognize a state of a movement of a user, and, when the movement of the user stops, may provide an alarm with respect to a call that was missed while the user was moving.

In accordance with an aspect of the present disclosure, a method of executing an alarm with respect to a missed received call for a mobile communication terminal is provided. The method includes determining whether the mobile communication terminal is moving, and determining whether a missed received call occurs while the mobile communication terminal is moving, and executing an alarm with respect to the missed received call when it is determined that the mobile communication terminal does not move for a period of time if it is determined that the missed received call occurs while the mobile communication terminal is moving.

In accordance with another aspect of the present disclosure, an apparatus for executing an alarm with respect to a missed received call for a mobile communication terminal is provided. The apparatus includes a communication module configured to transmit and receives a wireless signal, and a controller configured to determine whether the mobile communication terminal is moving, to determine whether a missed received call occurs while the mobile communication terminal is moving, to execute an alarm with respect to the missed received call when it is determined that the mobile communication terminal does not move for a predetermined period of time if it is determined that the missed received call occurs while the mobile communication terminal is moving.

In accordance with another aspect of the present disclosure, a method of executing an alarm with respect to a missed received call for a mobile communication terminal is provided. The method includes determining whether the mobile communication terminal is moving, determining a received call of the mobile communication terminal to be a missed received call if the received call is received while it is determined that the mobile communication terminal is moving, and executing an alarm with respect to the missed received call when it is determined that the mobile communication terminal does not move for a period of time after the movement of the mobile communication terminal stops.

As described above, through use of a method and apparatus for executing an alarm with respect to a missed received call for a mobile communication terminal, the mobile communication terminal may sense a missed call that a user fails to answer while the user moves, and may enable the user to recognize the missed call when the user stops, thereby enhancing a communication function which is a basic function of the mobile communication terminal and improving the user's convenience.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A, 3B, 3C, 3D, and 3E are a flowchart of an alarm with respect to a missed call for a mobile communication terminal according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
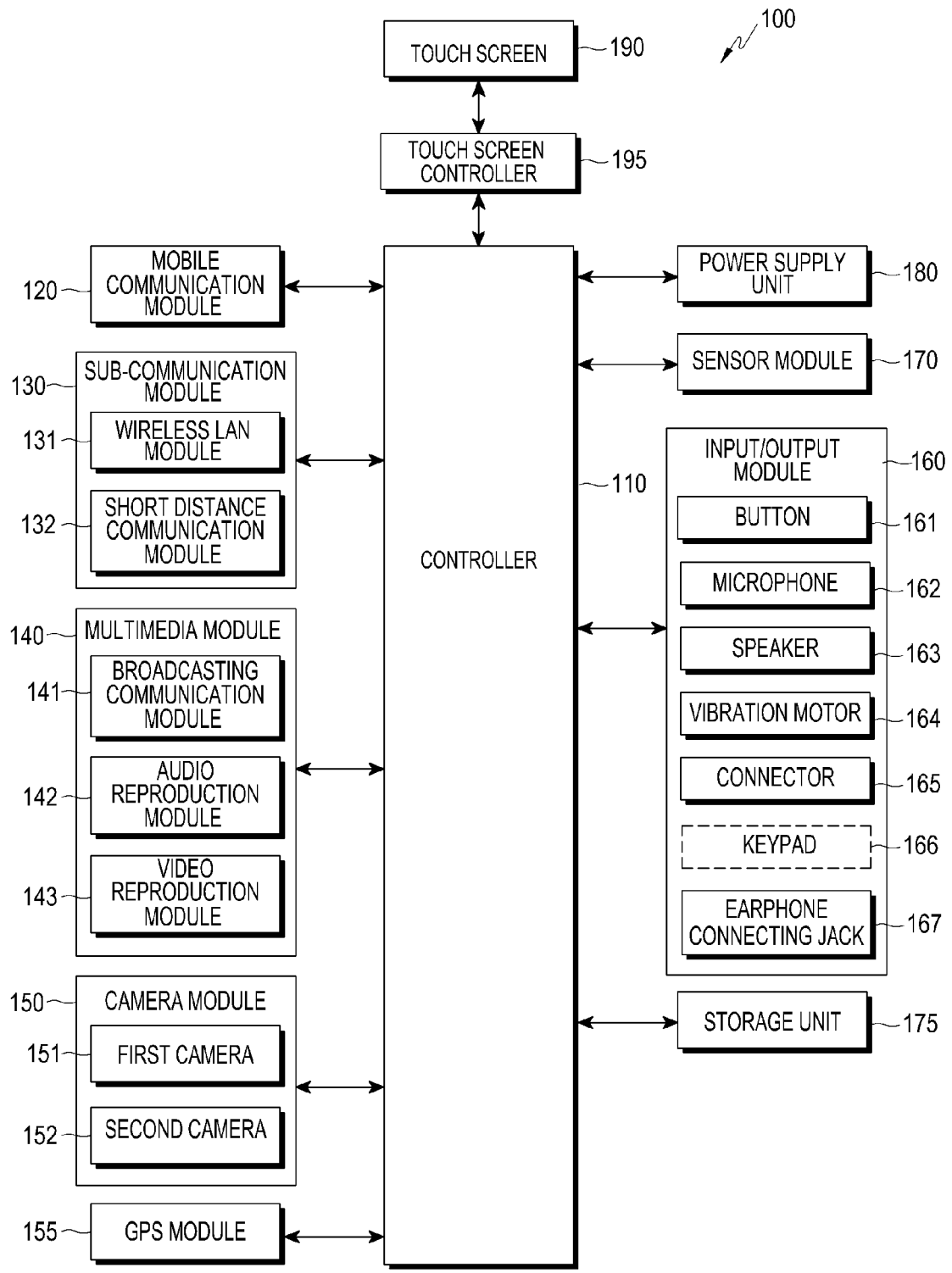
FIG. 1 is a diagram of a mobile communication terminal that performs an alarm with respect to a missed received call according to an embodiment of the present disclosure.

FIG. 1 is a diagram of a mobile communication terminal that performs an alarm with respect to a missed received call according to an embodiment of the present disclosure.

Referring to FIG. 1, a mobile communication terminal 100 includes a controller 110, a mobile communication module 120, a sub-communication module 130, a multimedia module 140, a camera module 150, a Global Positioning System (GPS) module 155, an input/output module 160, a sensor module 170, a storage unit 175, a power supply unit 180, a touch screen 190, and a touch screen controller 195. The sub-communication module 130 includes at least one of a wireless Local Area Network (LAN) module 131 and a short distance communication module 132. The multimedia module 140 includes at least one of a broadcasting communication module 141, an audio reproduction module 142, and a video reproduction module 143. The camera module 150 includes at least one of a first camera 151 and a second camera 152. The input/output module 160 includes at least one of a button 161, a microphone 162, a speaker 163, a vibration motor 164, a connector 165, a keypad 166, and an earphone connecting jack 167. Hereinafter, descriptions will be made as to a case where a display unit of the mobile communication terminal is the touch screen 190 and a display unit controller is the touch screen controller 195.

The power supply unit 180 may supply power to at least one battery (not illustrated) provided in a housing of the mobile communication terminal 100 according to a control of the controller 110. The at least one battery supplies power to the mobile communication terminal 100. In addition, the power supply unit 180 may supply power input from an external power source (not illustrated) through a wired cable connected to the connector 165 of the mobile communication terminal 100. In addition, the power supply unit 180 may supply power wirelessly input from the external power source through a wireless charging technology of the mobile communication terminal 100.

The camera module 150 may include at least one of the first camera 151 and the second camera 152, each of which photographs a still image and/or a moving image according to a control of the controller 110.

The multimedia module 140 may include the broadcasting communication module 141, the audio reproducing module 142, and/or the moving image reproducing module 143. The broadcasting communication module 141 may receive a broadcasting signal, e.g., a TV broadcasting signal, a radio broadcasting signal, and/or a data broadcasting signal, which is transmitted from a broadcasting station. The broadcasting communication module 141 may receive broadcasting additional information, e.g., an Electric Program Guide (EPG) and/or an Electric Service Guide (ESG), through a broadcasting communication antenna (not illustrated) according to a control of the controller 110. The audio reproduction module 142 may reproduce a digital audio file, for example, a file having a file extension of mp3, wma, ogg, or wav, stored and/or received according to a control of the controller 110. The moving image reproducing module 143 may reproduce a stored and/or received digital moving image file, e.g., a file having a file extension of mpeg, mpg, mp4, avi, mov, or mkv, according to a control of the controller 110. The moving image reproducing module 143 may reproduce a digital audio file.

The multimedia module 140 may include the audio reproduction module 142 and the video reproduction module 143, except for the broadcasting communication module 141. Further, the audio reproduction module 142 and/or the video reproduction module 143 of the multimedia module 140 may be included in the controller 110.

The mobile communication module 120 may connect the mobile communication terminal 100 to an external device through mobile communication, using at least one antenna according to a control of the controller 110. The mobile communication module 120 may transmit and/or receive a wireless signal for at least one of voice communication, image communication, a text message, such as Short Message Service (SMS), and a multimedia message, such as Multimedia Message Service (MMS), to and/or from at least one of another mobile communication terminal (not illustrated) of which a phone number is input to the mobile communication terminal 100, a smart phone (not illustrated), a tablet PC, or other apparatuses (not illustrated). Also, the mobile communication module 120 is connected to a wireless Internet and the like through any one of a Wi-Fi network, a $3^{rd}$ Generation (3G) data network, and/or a $4^{th}$ Generation (4G) data network, in a place where a radio Access Point (AP) is installed, and the mobile communication module 120 performs wireless transmission and/or reception of a wireless signal with neighboring devices.

The sub-communication module 130 may include at least one of the wireless LAN module 131 and the short distance communication module 132.

The wireless LAN module 131 may be Internet-connected in a place where a wireless AP (not illustrated) is installed according to a control of the controller 110. The wireless LAN module 131 supports a wireless LAN standard, such as any wireless LAN standard of the Institute of Electrical and Electronics Engineers (IEEE), such as IEEE 802.11x. The short distance communication module 132 performs wireless short distance communication among the other mobile communication terminal and the mobile communication terminals 100 according to a control of the controller 110.

The mobile communication terminal 100 may include at least one of the mobile communication module 120, the wireless LAN module 131, and the short distance communication module 132 based on a performance and/or use of the mobile communication terminal 100. For example, according to the performance of the mobile communication terminal 100, the mobile communication terminal 100 may include a combination of the mobile communication module 120, the wireless LAN module 131, and the short distance communication module 132.

The GPS module 155 may receive radio waves from a plurality of Earth-orbiting GPS satellites (not illustrated), and may calculate a position of the mobile communication terminal 100 using a time of arrival of the radio waves to the mobile communication terminal 100 from the plurality of Earth-orbiting GPS satellites.

The sensor module 170 includes at least one sensor that detects a state of the mobile communication terminal 100. For example, the sensor module 170 includes a proximity sensor (not illustrated) to detect a proximity of the user to the mobile communication terminal 100, a motion sensor (not illustrated) to detect a motion of the mobile communication terminal 100, for example, a rotation of the mobile communication terminal 100, an acceleration or vibration applied to the mobile communication terminal 100, or any other similar and/or suitable detectable motion of the mobile communication terminal 100, a luminance sensor (not illustrated) to detect an amount of light around the mobile communication terminal 100, a gravity sensor to detect a direction of gravity, and an altimeter (not shown) to detect an altitude by measuring atmospheric pressure. Also, the sensor module 170 may include a geo-magnetic sensor (not illustrated) to detect a point of the compass using a geomagnetic field, and an inertia sensor (not shown) that measures an angular displacement at a predetermined direction or a rate of change thereof.

The sensor of the sensor module 170 may be added or omitted according to a capability of the mobile communication terminal 100. At least one sensor may detect a state corresponding to the at least one sensor, generate a signal corresponding to the detected state, and transmit the generated signal to the controller 110.

The input/output module 160 may include at least one of the button 161, and/or a plurality of buttons 161, the microphone 162, the speaker 163, the vibration motor 164, the connector 165, and the keypad 166.

The button 161 may be disposed on at least one of a front surface, side surfaces, and a rear surface of a housing of the mobile communication terminal 100 and the button 161 or the plurality of buttons 161 may include at least one of a power/lock button (not illustrated), a volume button (not illustrated), a menu button, a home button, a back button, and a search button.

The microphone 162 may receive an input of voice or sound to produce an electrical signal according to a control of the controller 110.

At least one of the speaker 163 may be formed at a position and/or positions of the housing of the mobile communication terminal 100. The speaker 163 may output sounds which respectively correspond to various signals of the mobile communication module 120, the sub-communication module 130, the multimedia module 140, and/or the camera module 150, the various signals including, but not limited to a radio signal, a broadcasting signal, a digital audio file signal, a digital moving image file signal, and/or photographing signal, to the outside of the mobile communication terminal 100 according to a control of the controller 110.

The speaker 163 may output a sound which corresponds to the functions performed by the mobile communication terminal 100, for example, a button operation sound corresponding to a phone call or a ring back tone.

Also, according to a feature of performing an alarm, with respect to a missed received call for the mobile communication terminal 100, according to the present disclosure, the speaker 163 may output at least one of a predetermined voice, a predetermined dial tone, and any other similar and/or suitable sound, as an alarm with respect to a missed call.

The vibration motor 164 may convert an electric signal to mechanical vibration according to a control of the controller 110. For example, when the mobile communication terminal 100 is configured to a vibration mode and receives a voice call from any other apparatus (not illustrated), the vibration motor 164 is operated. At least one of the vibration motor 164 may be disposed in the housing of the mobile communication terminal 100. The vibration motor 164 may be operated in response to a user's touch and/or a user's motion that touches the touch screen 190 and a continuous touch movement on the touch screen 190, or in response to any suitable and/or similar user input and/or event corresponding to the mobile communication terminal 100. According to a feature of performing an alarm with respect to a missed received call for the mobile communication terminal 100 according to the present disclosure, the vibration motor 164 performs an operation of providing a vibration as an alarm with respect to a missed call.

The connector 165 may be used as an interface for connecting the mobile communication terminal 100 with an external device (not illustrated) and/or a power source (not illustrated). The mobile communication terminal 100 may transmit and/or receive data stored in the storage unit 175 of the mobile communication terminal 100 to and/or from an external device (not illustrated) through a wired cable connected to the connector 165 according to a control of the controller 110. Further, the mobile communication terminal 100 may receive power from a power source (not illustrated) through the wired cable connected to the connector 165 and/or charge a battery (not illustrated) by using the power source.

The keypad 166 may receive a key input from the user so as to control the mobile communication terminal 100. The keypad 166 includes a physical keypad (not illustrated) disposed on the mobile communication terminal 100 and/or a virtual keypad (not illustrated) displayed on the touch screen 190. The physical keypad (not illustrated) disposed on the mobile communication terminal 100 may be omitted according to the performance or the configuration of the mobile communication terminal 100.

An earphone (not illustrated) is inserted into the earphone connecting jack 167 to be connected with portable terminal 100.

The touch screen 190 may receive an input for manipulation from a user, and may display an execution image of an application program, an operation state, and a menu. The touch screen 190 may display a user interface corresponding to various services, for example, phone communication, data transmission, broadcasting, and photographing a picture, to the user. The touch screen 190 may transmit an analog signal corresponding to at least one touch input that is inputted into the user interface displayed on the touch screen controller 195. The touch screen 190 may receive at least one touch through a body part of the user, for example, fingers including a thumb, or a touchable input unit, and/or input device, for example, a stylus pen. Also, the touch screen 190 may receive a continuous motion of a touch input from among the at least one touch. The touch screen 190 may transmit an analog signal corresponding to the continuous movement of the touch input to the touch screen controller 195.

In the present disclosure, the touch is not limited to a contact between the touch screen 190 and a body part of a user and/or a touchable input unit and may include a contactless touch. A detectable distance that may be detected by the touch screen 190 is changed based on the performance or the configuration of the mobile communication terminal 100. Particularly, the touch screen 190 is configured to output a different value by distinguishing a value, for example, a current value and the like, detected by a touch event and a value detected by a hovering event, for example, a current value and the like, so that a touch event occurring by a contact between the input means and a body part of a user or a touchable input means, and a contactless touch input event, for example, hovering, are distinguished for detection. In addition, the touch screen 190 may output a different value by distinguishing a detected value based on a distance between the touch screen 190 and a space where a hovering event occurs.

The touch screen 190 may be implemented in, for example, a resistive type, a capacitive type, an infrared type, or an acoustic wave type touch screen, or any other similar and/or suitable type of touch screen.

The touch screen controller 195 converts the analog signal received from the touch screen 190 to a digital signal, for example, X and Y coordinates, and transmits the digital signal to the controller 110. The controller 110 may control the touch screen 190 by using the digital signal received from the touch screen controller 195. For example, the controller 110 may allow a short-cut icon (not illustrated) displayed on the touch screen 190 to be selected and/or a short-cut icon to be executed in response to a touch event and/or a hovering event. Further, the touch screen controller 195 may be included in the controller 110.

In addition, the touch screen controller 195 may detect a value, for example, a current value and the like, that is output through the touch screen 190, may determine a distance between the touch screen 190 and a space where the hovering event occurs, may convert a value of the determined distance into a digital signal, for example, a Z coordinate, and may provide the digital signal to the controller 110.

Further, the touch screen 190 may include at least two touch screen panels (not shown) which detect a touch and/or an approach of a user's body part and/or a touchable input unit in order to simultaneously receive inputs of the user's body part and the touchable input unit. The at least two touch screen panels provide different output values to the touch screen controller 195, and the touch screen controller 195 differently recognizes the values input from the at least two touch screen panels to determine whether the input from a respective touch screen panel, from among the at least two touch screen panels, is an input by the user's body part or an input by the touchable input unit. Also, according to a feature of performing an alarm with respect to a missed received call for the mobile communication terminal 100, the touch screen 190 may visually display an alarm associated with a missed received call, for example, outputting a predetermined screen, providing a popup window, and the like.

The storage unit 175 may store signals and/or data input and/or output in response to the operations of the mobile communication module 120, the sub-communication module 130, the multimedia module 140, the camera module 150, the GPS module 155, the input/output module 160, the sensor module 170, and the touch screen 190 according to a control of the controller 110. The storage unit 175 may store control programs and applications for controlling the mobile communication terminal 100 and/or the controller 110.

The term "storage unit" may include the storage unit 175, a Read Only Memory (ROM) (not illustrated) and/or a Random Access Memory (RAM) (not illustrated) included in the controller 110, or a memory card (not illustrated), for example, an Secure Digital (SD) card and a memory stick, contained in the mobile communication terminal 100. The storage unit may include a non-volatile memory, a volatile memory, a Hard Disc Drive (HDD) and/or a Solid State Drive (SSD).

The controller 110 may include a Central Processing Unit (CPU) (not illustrated), a ROM storing a control program that controls the mobile communication terminal 100, and a RAM used as a storage area for storing a signal and/or data input from the outside of the mobile communication terminal 100 and/or for an operation performed in the mobile communication terminal 100. The CPU may include a single core, a dual core, a triple core, a quadruple core, or any suitable number of cores. Furthermore, the CPU, the RAM and the ROM may be connected with each other through internal buses.

The controller 110 may control the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195, and any other elements, devices, and/or units included in the mobile communication terminal 100.

According to a feature of performing an alarm with respect to a missed received call for the mobile communication terminal 100 according to the present disclosure, the controller 110 may sense a state of a movement of the mobile communication terminal 100, for example, a moving state, a standstill state, and the like, and may control an operation of detecting a missed received call occurring, or in other words, detecting that a received call, which may be an incoming call, is at least one of missed, unanswered, disconnected, and/or terminated, while the mobile communication terminal 100 moves based on the sensed state of the movement of the mobile communication terminal 100 and based on the missed received call occurring, wherein the missed received call may occur in a case of a wireless signal being received by the mobile communication module 120. In this example, the missed received call may include a missed call, an unchecked text message (SMS), and an unchecked multimedia message (MMS). However, the present disclosure is not limited thereto, and the missed received call may be any other similar incoming message, alert, text message, audio message, video message, and information that is to be provided to a user of the mobile communication terminal 100. Furthermore, the missed received call may correspond to an incoming call to the mobile communication terminal 100, wherein the incoming call is not answered and/or accepted by the user of the mobile communication terminal 100, and such a missed received call may be referred to as an unanswered received call.

Also, in a case in which the missed received call occurs while movement of the mobile communication terminal 100 is detected, when the controller 110 senses that the movement of the mobile communication terminal 100 stops, and senses that the mobile communication terminal 100 does not move during a predetermined period of time, the controller 110 may control execution of an alarm with respect to the missed received call.

The state of the movement of the mobile communication terminal 100 may be sensed by repeatedly determining and/or calculating a location of the user, or, in other words, a location of the mobile communication terminal 100, using sensor data received, at predetermined intervals, from the sensor module 170 which may include, for example, a motion sensor, a geomagnetic sensor, an inertia sensor, and the like.

Also, in a case in which the controller 111 detects a missed received call and senses that the mobile communication terminal 100 moves when the missed received call is detected, the controller 111 may control an operation of determining that the missed received call occurs while movement of the mobile communication terminal 100 is detected.

After executing the alarm with respect to the missed received call, the controller 110 may perform a control so as to stop the alarm with respect to the missed received call, after a predetermined alarm operation time. The predetermined alarm operation time may be a time during which the alarm is conveyed to a user of the mobile communication terminal 100.

Also, the controller 110 may perform a control so as to stop the alarm with respect to the missed received call, so as to recognize a movement of the mobile communication terminal 100 by sensing the movement of the mobile communication terminal 100, so as to sense that the recognized movement of the mobile communication terminal 100 stops after a predetermined period of time, and so as to execute an alarm with respect to the missed received call when it senses that the mobile communication terminal 100 does not move during a predetermined period of time.

Also, the controller 110 may perform a control so as to send a user circumstance reporting message, which may be configured in advance, to a corresponding sender of a missed received call that corresponds to the missed received call occurring at the mobile communication terminal 100. Also, the controller 110 may perform a control so as to send the user circumstance reporting message to the corresponding sender of the missed received call only when a phone number of the corresponding sender is stored in the mobile communication terminal 100.

Also, when the phone number of the corresponding sender of the missed received call is not included in an execution list, which may be configured in advance, of an alarm with respect to a missed received call, which may be configured in advance, the controller 110 may perform a control so as not to proceed with the alarm with respect to the missed received call.

Figure 2:
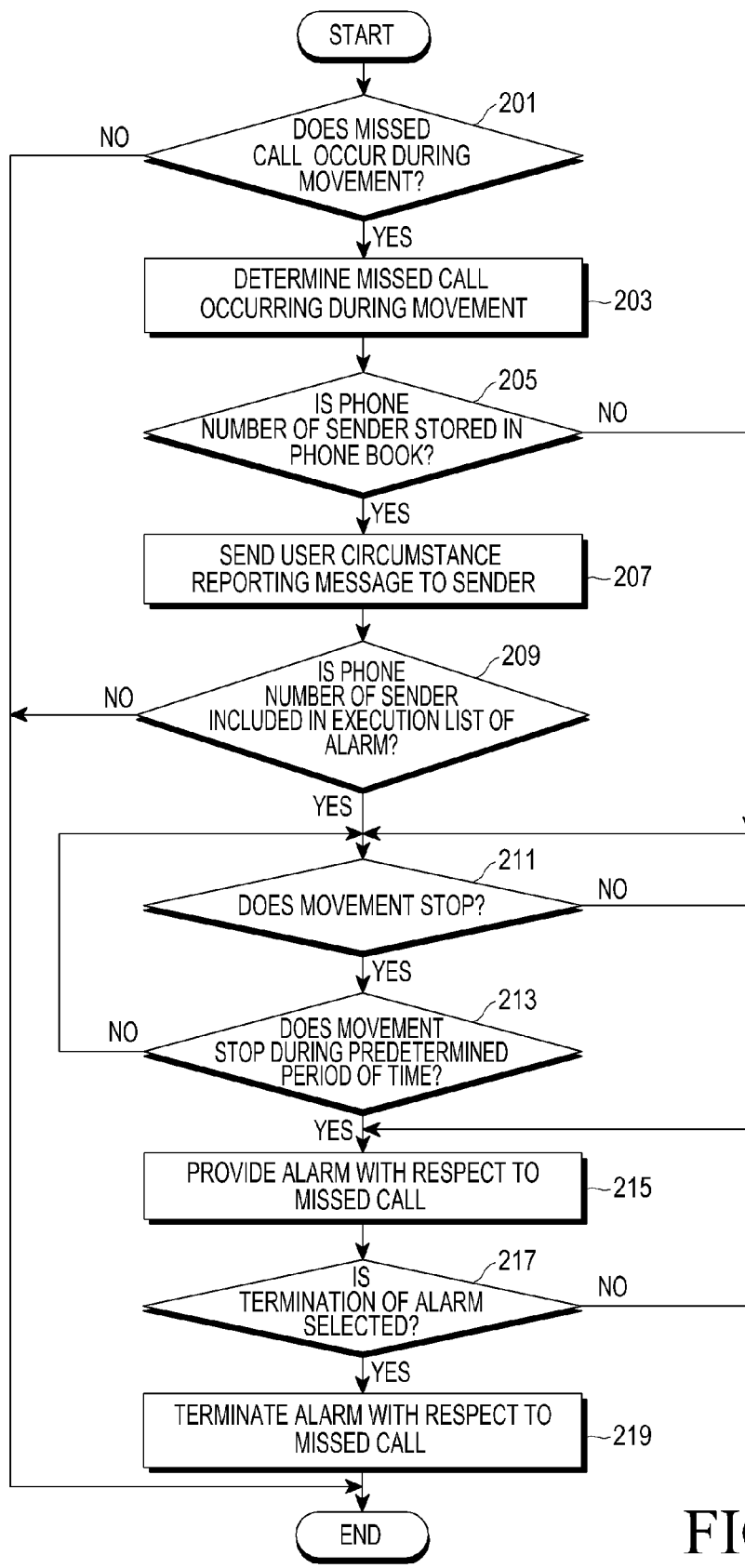
FIG. 2 is a diagram illustrating an alarm with respect to a missed call for a mobile communication terminal based on a state of a movement of a user that carries the mobile communication terminal according to an embodiment of the present disclosure.

FIG. 2 is a flowchart illustrating an alarm with respect to a missed call for a mobile communication terminal according to an embodiment of the present disclosure.

Referring to FIG. 2, the alarm with respect to a missed call is to determine a missed call occurring while a mobile communication terminal moves, when the missed call occurs while the mobile communication terminal moves as a user who carries the mobile communication terminal moves, and to execute an alarm that informs the user of the missed call when the movement of the user, that is, the movement of the mobile communication terminal, stops. In this example, the alarm that informs the user that the call has been missed is executed only when a standstill of the mobile communication terminal is maintained during a predetermined period of time.

In operation 201, it is determined whether a missed call occurs during movement of a mobile communication terminal as a user who carries the mobile communication terminal moves. That is, it is determined whether the missed call occurs, and it is determined whether the mobile communication terminal moves when the missed call is determined. When the result of the determination in operation 201 shows that the missed call occurs while the mobile communication terminal moves, the operation proceeds with operation 203. When the result of the determination in operation 201 shows that the missed call does not occur while the mobile communication terminal moves, the operation of the present disclosure is not executed.

In operation 203, the missed call occurring while the mobile communication terminal during movement is determined.

In operation 205, it is determined whether a phone number of a corresponding sender of the missed call is stored in the mobile communication terminal, for example, in a phone book, hereinafter referred to as a phone book of a mobile communication terminal. When the result of the determination in operation 205 shows that the phone number of the corresponding sender of the missed call is stored in the phone book of the mobile communication terminal, the operation proceeds with operation 207. When the phone number of the corresponding sender of the missed call is not stored in the phone book of the mobile communication terminal, the operation proceeds with operation 211.

In operation 207, a user circumstance reporting message, which may be configured in advance, is automatically transmitted to the corresponding sender of the missed call. In this example, the user circumstance reporting message is a message reporting that the user is moving and is unable to answer the call, which may be configured when manufactured and/or configured by the user.

In operation 209, it is determined whether the phone number of the corresponding sender of the missed call is included in an execution list of an alarm. In this example, the execution list of the alarm is a list, which the user may set in advance, and which may include desired phone numbers corresponding to persons and/or contacts, in the phonebook of the mobile communication terminal, to which an alarm for a missed call is to be applied. Through the execution list of the alarm, the alarm of the missed call may be selectively applied. When the result of the determination in operation 209 shows that the phone number of the corresponding sender of the missed call is included in the execution list, the operation proceeds with operation 211. When the phone number of the corresponding sender of the missed call is not included in the execution list of the alarm, the operation of the present disclosure is terminated.

In operation 211, it is determined whether the movement of the mobile communication terminal stops. When the result of the determination in operation 211 shows that the movement of the mobile communication terminal stops, the operation proceeds with operation 213. When the result of the determination in operation 211 shows that the movement of the mobile communication terminal does not stop, the operation proceeds again with operation 211 after a predetermined period of time.

In operation 213, it is determined whether the mobile communication terminal does not move, or in other words, it is determined whether movement of the mobile communication terminal has stopped, during a predetermined period of time. When the result of the determination in operation 213 shows that the mobile communication terminal does not move during the predetermined period of time, the operation proceeds with operation 215. When the result of the determination in operation 213 shows that the mobile communication terminal moves during the predetermined period of time, the operation proceeds again with operation 211.

In operation 215, an alarm with respect to the missed call is executed such that an alarm is provided. The alarm with respect to the missed call includes at least one of an operation of visually displaying an alarm on a screen of the mobile communication terminal, an operation of providing a vibration, an operation of outputting a predetermined voice, and an operation of outputting a predetermined sound. However, the present disclosure is not limited thereto, and the alarm with respect to the missed call may include any suitable and/or similar operation to convey information to a user of the mobile communication terminal In operation 217, it is determined whether termination of the alarm is selected based on a manipulation input from the user, such as a touch input, a voice command input, and the like. When the result of the determination in operation 217 shows that the termination of the alarm is selected, the operation proceeds with operation 219. When the result of the determination in operation 217 shows that the termination of the alarm is not selected, the operation proceeds again with step 215.

In operation 219, the termination of the alarm with respect to the missed call is executed.

In addition, after determining whether the termination of the alarm is selected by the manipulation input from the user in operation 217, and when the determination shows that the termination of the alarm is not selected, the alarm with respect to the missed call may automatically stop after a predetermined alarm operation time. In this example, the alarm operation time is a predetermined condition that enables the alarm to be maintained during a predetermined period of time, such as 1 minute, 2 minutes, or any predetermined amount of time. Also, when the mobile communication terminal moves again, after the alarm with respect to the missed call stops, the operation proceeds again with operation 211 that determines whether the movement of the mobile communication terminal stops.

FIGS. 3A to 3E are a flowchart of an alarm with respect to a missed call for a mobile communication terminal according to an embodiment of the present disclosure.

Referring to FIGS. 3A to 3E, an operation of automatically stopping an alarm with respect to a missed call, and operations of the present disclosure including subsequent operations will be described as follows. A few operations described with reference to FIG. 2 will be omitted.

Referring to FIG. 3A, when a user who carries a mobile communication terminal fails to answer a call received while the user moves, that is, when the user fails to answer a call received while the mobile communication terminal moves, it is determined that a missed call occurs while the mobile communication terminal is moving.

Referring to FIG. 3B, as the user stops the movement, the mobile communication terminal senses that the mobile communication terminal has moved and has determine that the movement is interrupted.

Referring to FIG. 3C, when a standing still of the mobile communication terminal, or in other words, the interruption of the movement of the mobile communication terminal, is maintained for at least a predetermined period of time, for example, at least 5 seconds, the mobile communication terminal senses the same and displays a popup window on a screen as an alarm with respect to the missed call, and provides at least one of a predetermined sound, a predetermined voice, and vibration. In this example, the popup window displayed on the screen and the sound is configured to disappear after a predetermined period of time, for example, 5 seconds, so that the alarm with respect to the missed call may automatically stop. When the user touches an icon, for example, "stop display", for terminating the alarm after checking, and/or being alerted and/or notified of, the missed call, the mobile communication terminal senses the same, and terminates the operation of the present disclosure.

Referring to FIG. 3D, when the touch, input by the user, on the icon, for example, "stop display", for terminating the alarm after checking, and/or being alerted of, the missed call is not sensed, the mobile communication terminal senses that the mobile communication terminal has moved and that the movement of the mobile communication terminal is interrupted.

Referring to FIG. 3E, when a standing still of the mobile communication terminal is maintained for at least a predetermined period of time, for example, at least 5 seconds, the mobile communication terminal senses the same, and executes the alarm again with respect to the missed call as described in FIG. 3C.

In addition, according to an embodiment of the present disclosure, when the mobile communication terminal does not move within a predetermined period of time configured for termination of an alarm, after the alarm with respect to the missed call stops, the alarm with respect to the missed call may be executed as described in operation 215.

According to an embodiment of the present disclosure, when the mobile communication terminal moves again after the alarm with respect to the missed call stops, a frequency of execution of an alarm after the alarm with respect to the missed call stops is determined, and when the frequency is greater than a predetermined frequency, operation 211, which determines whether the mobile communication terminal stops is not performed again, and termination of the alarm with respect to the missed call is executed as described in operation 219.

The method and apparatus for executing an alarm with respect to a missed received call for a mobile communication terminal may be configured and operated according to an embodiment of the present disclosure. Although an embodiment of the present disclosure has been described, various embodiments of the present disclosure or various modifications and changes may be possible. For example, the individual operations described herein may be entirely or partially executed in parallel, may be partially omitted, or may include other additional operations.

Although an embodiment of the present disclosure has described the operation for a missed call as one of the examples of a missed received call, the operation may be applied to an unchecked text message (SMS) or a multimedia message (MMS) occurring while a mobile communication terminal moves.

Although an embodiment of the present disclosure has described that a mobile communication terminal automatically sends a user circumstance reporting message, configured in advance, to a corresponding sender of a missed call when a phone number of the corresponding sender of the missed call is stored in the mobile communication terminal, the user circumstance reporting message may be automatically sent to any sender corresponding to a missed call. Also, the user circumstance reporting message may be automatically sent to predetermined persons.

It will be appreciated that an embodiment of the present disclosure may be implemented in a form of hardware, software, and/or a combination of hardware and software. Regardless of being erasable or re-recordable, such software may be stored in a non-volatile storage device such as a ROM, a memory such as an Random Access Memory (RAM), a memory chip, a memory device, an integrated circuit, a storage medium such as a Compact Disc (CD), a Digital Versatile Disc (DVD), a magnetic disc, or a magnetic tape that is optically and/or electromagnetically recordable and readable by a machine, for example, a computer. It will be appreciated that a memory, which may be incorporated in a portable terminal, may be an example of a machine-readable storage medium, which may be configured to store a program and/or programs including commands to implement an embodiment of the present disclosure. Therefore, an embodiment of the present disclosure provides a program including codes for implementing a system and/or method claimed in any claim of the accompanying claims and a machine-readable device configured to store such a program. Moreover, such a program as described above can be electronically transferred through an arbitrary medium, such as a communication signal transferred through cable or wireless connection, and the present disclosure properly includes the things equivalent to that.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of executing an alarm with respect to a missed received call for a mobile communication terminal, the method comprising:
   determining whether a mobile received call occurs while the mobile communication terminal is moving;
   executing an alarm with respect to the missed received call when it is determined that the mobile communication terminal does not move for a period of time when it is determined that the missed received call occurs while the mobile communication terminal is moving;
   stopping the alarm with respect to the missed received call after an alarm operation time;
   determining whether the mobile communication terminal moves after the stopping of the alarm with respect to the missed received call;
   identifying a frequency of execution of the alarm with respect to the missed received call, when it is determined that the mobile communication terminal moves after stopping of the alarm with respect to the missed received call;
   determining again whether a movement of the mobile communication terminal stops, when the frequency is smaller than a predetermined frequency; and
   executing another alarm with respect to the missed received call when it is determined that the mobile communication terminal does not move for the period of time, after the determining that the movement of the mobile communication terminal stops, based on the determining again whether the movement of the mobile communication terminal stops.

2. The method of claim 1, further comprising; sending a user circumstance reporting message, the user circumstance message being configured in advance, to a corresponding sender of the missed received call.

3. The method of claim 2, further comprising: sending the user circumstance reporting message to the corresponding sender of the missed received call when a phone number of the corresponding sender is stored in the mobile communication terminal.

4. The method of claim 1, wherein, before the executing of the alarm with respect to the missed received call, the method further comprises:
   determining whether a phone number of a corresponding sender of the missed received call is included in an execution list of the alarm with respect to the missed received call, the execution list of the alarm being configured in advance; and
   not proceeding with a process of executing the alarm with respect to the missed received call when the phone number of a corresponding sender of the missed received call is not included in an execution list of the alarm with respect to the missed received call.

5. The method of claim 1, wherein the alarm with respect to the missed received call comprises at least one of an operation of visually displaying an alarm on a screen of the mobile communication terminal, an operation of providing a vibration, an operation of outputting a voice, and an operation of outputting a sound.

6. An apparatus for executing an alarm with respect to a missed received call for a mobile communication terminal the apparatus comprising:
   a communication hardware module configured to transmit and receive a wireless signal; and
   a controller configured to:
   determine whether a missed received call occurs while the mobile communication terminal is moving,
   execute an alarm with respect to the missed received call when it is determined that the mobile communication terminal does not move for a period of time when it is determined that the missed received call occurs while the mobile communication terminal is moving,
   stop the alarm with respect to the missed received call, after an alarm operation time,
   determine whether the mobile communication terminal moves after the stopping of the alarm with respect to the missed received call,
   identify a frequency of execution of the alarm with respect to the missed received call, when it is determined that the mobile communication terminal moves after stopping of the alarm with respect to the missed received call,
   determine again whether a movement of the mobile communication terminal stops, when the frequency is smaller than a predetermined frequency, and execute another alarm with respect to the missed received call when it is determined that the mobile communication terminal does not move for a period of time after the determining that the movement of the mobile communication terminal stops, based on the determining again whether the movement of the mobile communication terminal stops.

7. The apparatus of claim 6, wherein the controller is further configured to send a user circumstance reporting message, the user circumstance message being configured in advance, to a corresponding sender of the missed received call.

8. The apparatus of claim 7, wherein, when a phone number of the corresponding sender is stored in the mobile communication terminal, the controller is configured to send the user circumstance reporting message to the corresponding sender of the missed received call.

9. The apparatus of claim 6, wherein, before the controller executes the alarm with respect to the missed received call, the controller is further configured to:
   determine whether a phone number of a corresponding sender of the missed received call is included in an execution list of the alarm with respect to the missed received call, the execution list of the alarm being configured in advance; and
   not to proceed with the alarm with respect to the missed received call when the phone number of a corresponding sender of the missed received call is not included in an execution list of the alarm with respect to the missed received call.

10. The apparatus of claim 6, wherein the alarm with respect to the missed received call includes at least one of an operation of visually displaying an alarm on a screen of the mobile communication terminal, an operation of providing a vibration, an operation of outputting a voice, and an operation of outputting a sound.

11. A method of executing an alarm with respect to a missed received call for a mobile communication terminal, the method comprising:
   determining a received call of the mobile communication terminal to be a missed received call when the received call is received while it is determined that the mobile communication terminal is moving;
   executing an alarm with respect to the missed received call when it is determined that the mobile communication terminal does not move for a period of time after the movement of the mobile communication terminal stops;
   stopping the alarm with respect to the missed received call after an alarm operation time; determining whether the mobile communication terminal moves after the stopping of the alarm with respect to the missed received call;
   identifying a frequency of execution of the alarm with respect to the missed received call, when it is determined that the mobile communication terminal moves after stopping of the alarm with respect to the missed received call;
   determining again whether a movement of the mobile communication terminal stops, when the frequency is smaller than a predetermined frequency; and
   executing another alarm with respect to the missed received call when it is determined that the mobile communication terminal does not move for the period of time after the determining that the movement of the mobile communication terminal stops, based on the determining again whether the movement of the mobile communication terminal stops.

12. The method of claim 11, wherein the determining of the received call of the mobile communication terminal to be the missed received call comprises:
   determining whether the mobile communication terminal receives a call; and
   determining whether the received call is received by the mobile communication terminal while it is determined that the mobile communication terminal is moving.

13. The method of claim 11, further comprising: sending a user circumstance reporting message, the user circumstance message being configured in advance, to a corresponding sender of the missed received call.

14. The method of claim 13, further comprising: sending the user circumstance reporting message to the corresponding sender of the missed received call when a phone number of the corresponding sender is stored in the mobile communication terminal.

15. The method of claim 11, wherein, before the executing of the alarm with respect to the missed received call, the method further comprises:
   determining whether a phone number of a corresponding sender of the missed received call is included in an execution list of the alarm with respect to the missed received call, the execution list of the alarm being configured in advance; and
   not proceeding with a process of executing the alarm with respect to the missed received call when the phone number of a corresponding sender of the missed received call is not included in an execution list of the alarm with respect to the missed received call.

16. The method of claim 11, wherein the alarm with respect to the missed received call comprises at least one of an operation of visually displaying an alarm on a screen of the mobile communication terminal, an operation of providing a vibration, an operation of outputting a voice, and an operation of outputting a sound.

* * * * *